United States Patent [19]

Covillion

[11] 4,447,712

[45] May 8, 1984

[54] HEATING SYSTEM

[76] Inventor: Joseph E. Covillion, 3 Tumblebrook Rd., Terryville, Conn. 06786

[21] Appl. No.: 351,786

[22] Filed: Feb. 24, 1982

[51] Int. Cl.³ .............................................. H05B 1/02
[52] U.S. Cl. ................................. 219/486; 219/358; 219/494; 219/519; 219/508; 307/39
[58] Field of Search ............... 219/492, 350, 490, 356, 219/494, 358, 497, 364, 508–510, 483, 486, 514, 519; 307/39–41

[56] References Cited

U.S. PATENT DOCUMENTS

| | | | |
|---|---|---|---|
| 3,387,194 | 6/1968 | Banks | 318/139 |
| 3,496,337 | 2/1970 | Voglesonger | 219/486 |
| 3,586,869 | 6/1971 | Kompellen | 307/41 |
| 3,718,848 | 2/1973 | Hines | 318/139 |
| 3,855,452 | 12/1974 | Flaza et al. | 219/486 |
| 3,886,426 | 5/1975 | Dagget | 318/139 |
| 3,984,699 | 10/1976 | Bailey | 307/41 |
| 4,010,412 | 3/1977 | Forman | 219/486 |
| 4,215,277 | 7/1980 | Weiner et al. | 307/41 |
| 4,292,502 | 9/1981 | Adams | 219/486 |

Primary Examiner—M. H. Paschall
Attorney, Agent, or Firm—St. Onge, Steward, Johnston & Reens

[57] ABSTRACT

A system for space heating a dwelling, office and the like having a plurality of heating means and having a control mechanism for sequentially actuating said heating means to actuate only one said heating means at a time.

14 Claims, 4 Drawing Figures

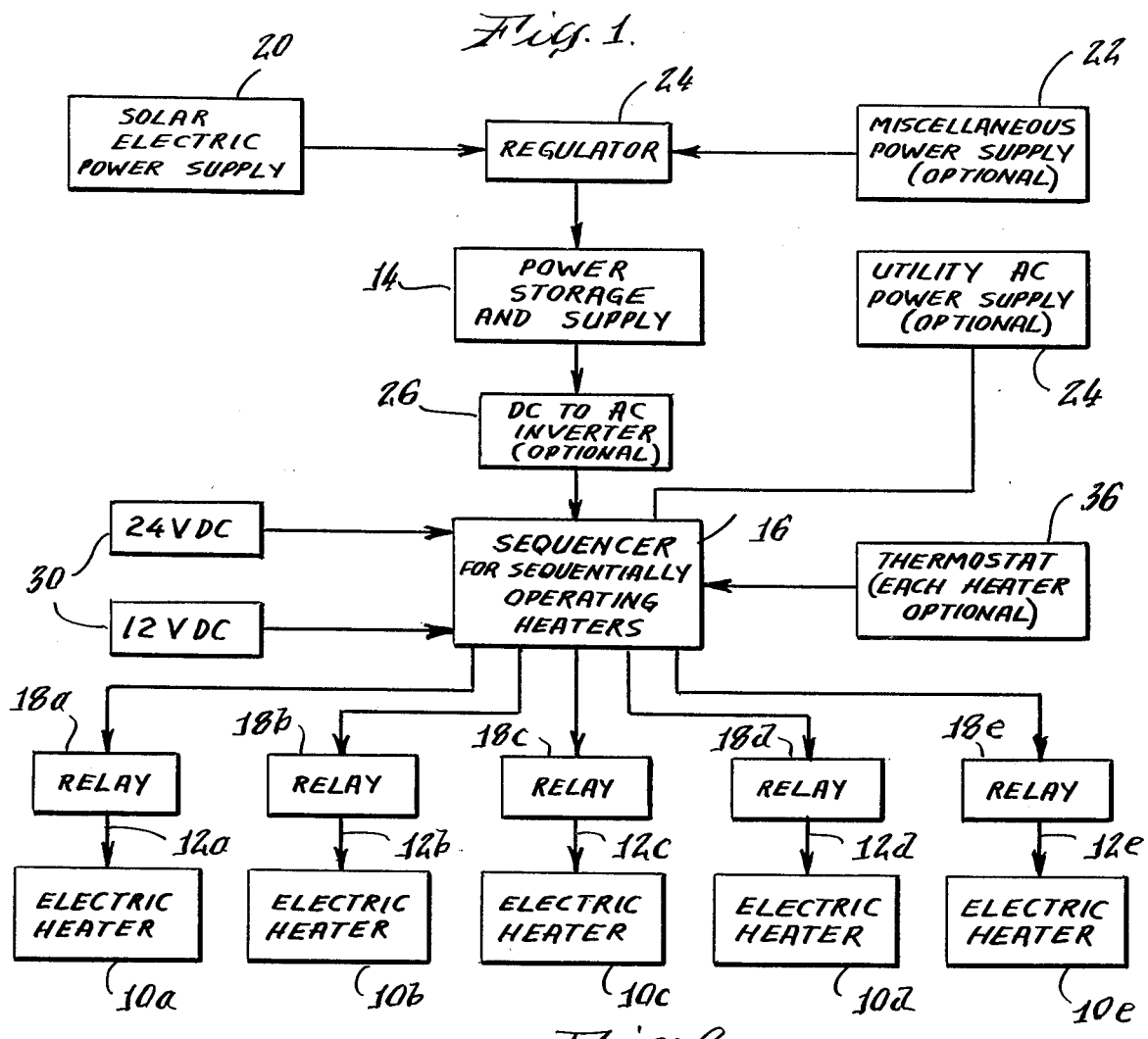
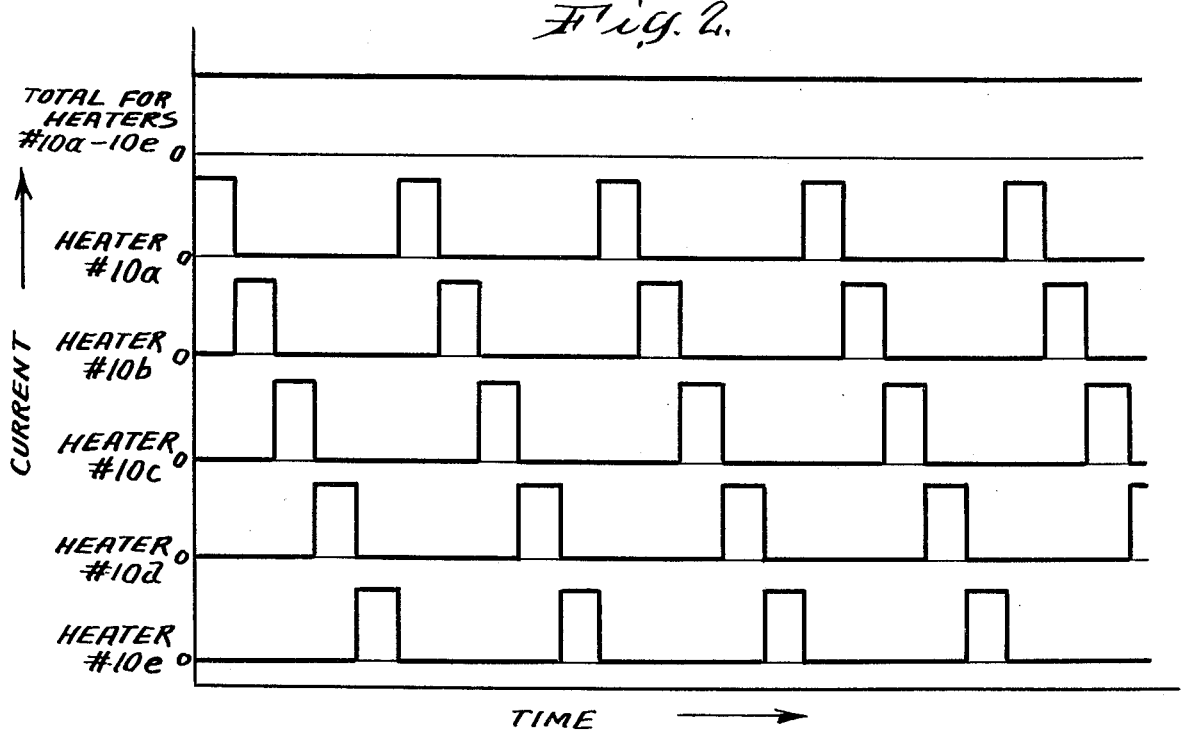

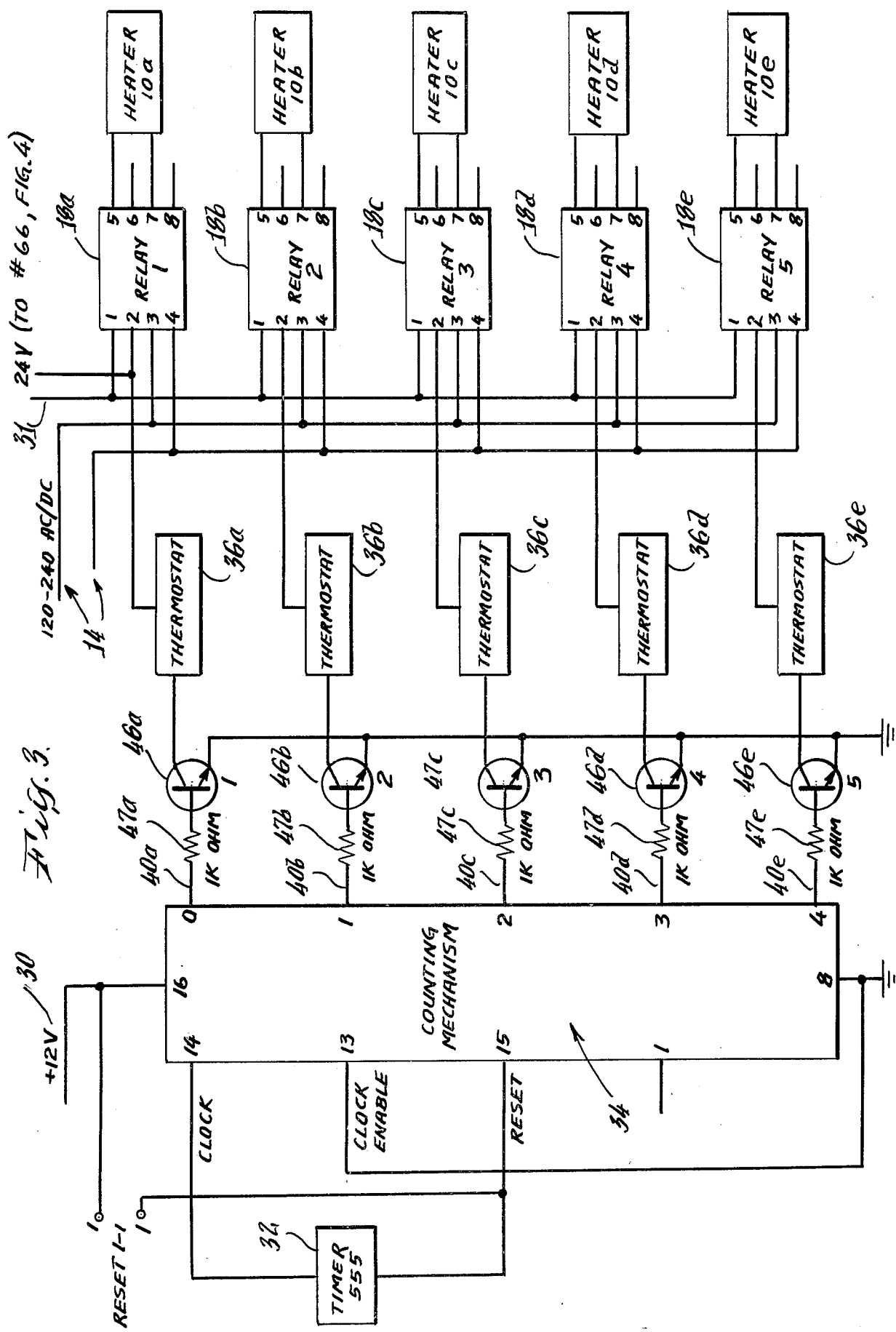

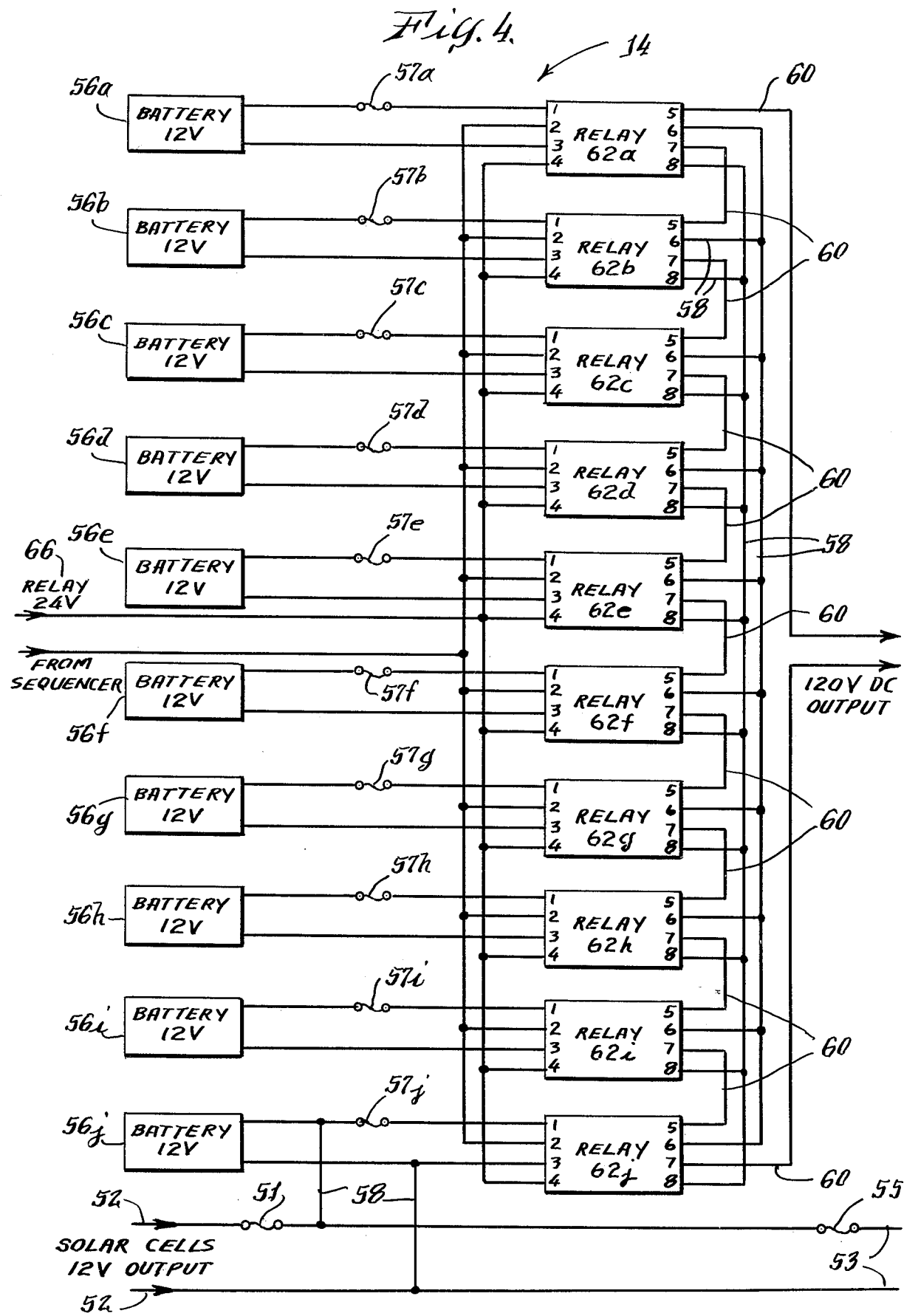

HEATING SYSTEM

BACKGROUND OF THE INVENTION

1. Field of the Invention

The present invention relates to a system for space heating a dwelling, office and the like, and, more specifically, the present invention relates to a heating system which utilizes relatively low amounts of current, such as, for example, power generated by solar cells and stored in a group of batteries.

2. Description of the Prior Art

Many systems have been designed to utilize solar cells, that is, silicon photovoltaic cells, for the generation of power. For example, in an article published in *Mechanix Illustrated*, Feb. 19, 1980, pages 46 and 47, it is disclosed that a large bank of 33,600 photovoltaic cells can power a 500-watt radio station from dawn to dusk. Several conventional systems utilizing photovoltaic cells require large numbers of cells to generate sufficient power for most applications including applications where it is desired to heat a dwelling, office and the like.

In a conventional space heating system for dwelling, office and similar uses, a plurality of electrical resistance heaters, typically requiring approximately 500 to 1500 watts of power, are positioned in various rooms. In a simple system, the actuation of the group of heaters is controlled by a single thermostat and, thus, all heaters are either on or off. In more sophisticated systems, several thermostats are provided, perhaps as many as one thermostat for each room. Even in the most sophisticated systems, several heaters are on during lengthy periods of the day thus drawing extensive amount of current. Because of the periodic high demands for current in electrically heated dwellings, offices or the like, it has been found to be difficult to adapt photovoltaic cells for use in supplying current to a group of electrical heaters.

SUMMARY OF THE INVENTION

In accordance with the present invention, a system for space heating a dwelling, office and the like is provided. The system includes a plurality of electrically powered space heaters, such as, for example 500 to 1500 watt resistance heaters. The number of heaters will vary depending upon the space to be heated. Each heater or group of heaters is operable independently of the other heaters or groups of heaters. For example, it may be desirable to provide in one room a group of three low wattage (500 watt) resistance heaters that are connected in series and and in another room a single 1500 watt heater. The present invention contemplates the use of a plurality of independently operable heaters or independently operable groups of heaters.

The system in accordance with the present invention includes a source of electrical power for operating the plurality of heaters. In accordance with one aspect of the invention, the power source comprises a bank of photovoltaic cells connected to a power storage device, which will be described in detail, hereinafter. The solar cells are preferably supplemented by a utility source of power and, if desired, the power generated by means such as windmills and water generated power may also provide a supplemental source of power.

The above described solar energy source of power typically provides the storage device with relatively low amounts of available current, and, thus it is believed to be undesirable to connect such storage directly to all of the resistance heaters in a space heating system for a dwelling, office and the like because the current demands of all of the heaters would be excessive.

In accordance with the present invention, a control mechanism is provided and is connected between the power source and the inputs of the plurality of heaters. The control mechanism controls on and off operation of each of the heaters. The control mechanism includes for each of the heaters a normally open switch that is responsive to a signal. Thus, when a given switch receives a signal, it connects its respective heater with the power source. The control means includes a mechanism for generating a signal for closing each of the switching means for a time interval to thereby power its respective heater. The signal generating mechanism signals in a sequence a plurality of switches to close only one switch at a time. Thus, since only a single switch is closed at any given time, only one heater is powered during a given time period, and, thus the current supplied is relatively low and generally constant. For example, if a system in accordance with the present invention has five 1500 watt electrical resistance heaters connected thereto, only one heater in any given time will be connected to the power source for a time interval. After the first interval has elapsed, the first switch will open thereby switching off power to the first heater and the second switch will close thereby turning on the second heater. This sequence continues through the third, fourth and fifth heaters and then returns to the first heater. It should be apparent that the heating system of the present invention can be adapted to any number of heaters provided there are two or more heaters or groups of heaters.

In accordance with one aspect of the invention, the sequence of actuation of the heaters is repeating. Thus, the heaters will be turned on for a predetermined time interval in a set order that will be repeated. Further, in accordance with the present invention, it is preferred that the time interval that all of the heaters is on be constant. However, it is contemplated that the heating system of the present invention may be modified to vary the time interval for a given heater. For example, if one heater is heating a relatively large space in comparison to another heater, it may be desirable to have the heater heating the large space be powered for a longer time interval.

In accordance with one aspect of the invention, the control system is thermostatically controlled. Thus, a thermostat control mechanism is connected between the signal generating mechanism and the switches to provide for actuation of the switches only when the room temperature falls below a present thermostat level. Thus, in accordance with the present invention, a single thermostat for all of the heaters may be used. However, it should be understood that it is preferred to provide a thermostat for each heater that is located proximate its respective heater. Thus, as the signal generating mechanism provides a signal for a given time interval, the thermostat may sense that there is no requirement for additional heat and, the circuit between the signal generating device and the switch for that respective heater is broken and no heat is required for the time interval.

In accordance with one aspect of the invention, the control mechanism, which is also referred to as a "sequencer", comprises a counting mechanism that includes an output for each heater or group of heaters in the system. The counting device is a conventional device that provides an output signal that is sequentially transmitted from its group of output terminals. The counting mechanism suitable for use in the present invention comprises a decade counter sold by various companies under the designation RS 4017. This counter has ten output terminals and, thus, is suitable for ten separate heaters. It should be understood that various types of counters may be used and can include two or more output terminals. In addition to including a counter mechanism, the sequencer of the present invention also includes a timer, which is also referred to as a "clock", which triggers the counting mechanism to move the output signal from one output terminal to the next in a sequence pre-programmed in the counting mechanism. The timer is set for a constant time interval for each heater and, thus, the counting mechanism sequentially moves through its output terminals in accordance with the amount of time set on the timer. In accordance with a preferred aspect of the invention, the timer is set for four to five minutes.

In accordance with one aspect of the invention wherein solar cells are utilized, a chargeable power storage device is provided. The power storage device includes an input for receiving power from photovoltaic cells and includes an output for supplying power to the heating system. The storage device also includes a plurality of storage mechanisms, and, most preferably ten batteries, although the number of batteries for a particular heating system varies depending on the power requirements of that system. The storage device also includes circuitry for connecting in parallel the batteries to the input to provide for charging. Further, the device includes circuitry for connecting in series the batteries to provide for power output. When twelve volt batteries are used, the power output is approximately 120 volts. The storage device also includes a switching mechanism that is responsive to a signal that indicates demand for power or lack of demand for power. The switching mechanism is normally in a position to connect the batteries in parallel to provide for charging. Upon current demand by the heating system, the signal is provided by the sequencer and the switching mechanism connects the batteries in series to provide a power output. In accordance with a preferred aspect of the invention, the switching mechanism comprises a switch, preferably a relay, for each of the batteries. The switches are connected to each other and to the batteries to provide for parallel connection of the batteries when the switch is in one position and series connection of the batteries when the switches are in another position.

As can be appreciated from the foregoing summary of the invention, the heating system in accordance with the present invention is particularly simple to construct and provides for heating of a group of rooms in a dwelling, office and the like with the use of relatively low current supply by virtue of actuating only a single heater or group of heaters at a given time. Additional advantages of the heating system of the present invention will be set forth in the detailed description of the invention with reference to the drawings that follows.

BRIEF DESCRIPTION OF THE DRAWINGS

FIG. 1 is a schematic block diagram of a system in accordance with the present invention;

FIG. 2 is a plot of the current supplied to each of the heaters over a period of time;

FIG. 3 is a detailed circuit diagram of the heating system shown schematically in FIG. 1, and, in particular FIG. 3 shows the construction of the sequencer which controls actuation of the seveal heaters; and FIG. 4 is a detailed circuit diagram of the power generating and storage device shown schematically in FIG. 1.

DETAILED DESCRIPTION OF THE INVENTION

Referring to FIG. 1, this figure is a schematic block diagram of a system in accordance with the present invention. The heating system include a plurality of electrically powered space heating devices 10 which are preferably conventional electrical resistance heaters. During the detailed description, where a series of identical components are described, each component will be numbered with an arabic number followed by a letter. Five electrical heaters 10a, 10b, 10c, 10d and 10e are used in the heating system shown in the drawings. It should be understood, however, that a heating system in accordance with the present invention may include two or more heaters. Further, with respect to any particular heating device, such as, for example 10a, this particular heater device could include a single resistance heater such as a conventional 1500 watt heater, or, may include a plurality of heaters, such as, for example three 500 watt heaters. Each of the heaters 10 is operable independently of the other heaters and each includes an input 12. A source of electrical power 14 is provided for operating the heaters 10. The power source is connectable through a control mechanism, which will be described hereinafter, to inputs 12 of the heaters 10 to power them.

The heating system also includes a control mechanism 16, also referred to as a sequencer, connected between power source 14 and inputs 12 of the heaters 10. The control mechanism provides for on and off operation of each heater 10. The control mechanism 16 includes for each heater 12 a normally open switch 18 for connecting and disconnecting its respective heater 12 to the power source 14. As will be described in detail hereinafter with reference to FIG. 3, the control mechanism 16 generates a signal for closing each switch 18 for a time interval to power the switch's respective heater. The control mechanism generates a signal in a sequence to close only one switch at a time to thereby power its respective heater for that time interval.

Referring in particular to FIG. 2, this figure is a plot of the current supplied to each heater 10 over a period of time. When the heating system becomes operational, the control mechanism provides a signal to relay 18a to close this switch to enable the power supply 14 to supply current only to electric heater 10a. As shown in FIG. 2 at heater 10a, this heater is the only heater being powered for the initial time period. As can be seen by comparing the current drawn by heater 10a and the current drawn by heater 18, it is shown that after a given time interval, the control mechanism 16 signals relay 18a to open and relay 18b to close thereby providing current only to heater 18b. As can be appreciated from FIG. 2, as time continues, each heater is sequentially turned on while the other heaters are turned off. It should be understood, however, that after current is no longer supplied to a given heater, that heater is still at an elevated temperature and still provides heat to the room in which it is located. As can be seen by reference to FIG. 2, the sequence of actuation of the heaters is repeated continuously. Referring to the top diagram in FIG. 2 titled "Total For Heaters 10a–10c", it should be understood that over a long period of time, the plurality of heaters draws at most a minimal amount of current, and, if all of the heaters are operating sequentially the current level drawn is substantially constant, although, there may be some variation in the current level when one heater switches off and the next heater switches on.

The heating system described is particularly suitable for use in a heating system supplied with energy generated by photovoltaic solar cells. Referring once again to FIG. 1, the power supply 14 is supplied by a group of photovoltaic solar energy cells 20. Although the number of cells used will vary depending upon the efficiency of the cells, and the space of the area to be heated, in general, the heating system of the present invention because its draws a reduced amount of current, can utilize a reduced number of photovoltaic cells. Thus, a heating system in accordance with the invention is particularly economical as well as efficient. As technology relating to photovoltaic cells improves, it is expected that the number of solar cells used in connection with the heating system of the present invention may be reduced or increased. It is also contemplated that various other sources of energy may be utilized including, but not limited, wind generated and water generated power supply indicated at reference character 22 of FIG. 1. The heating system in accordance with the present invention may include a regulator 24 for regulating the voltage and current supplied by the various sources of power. In addition, the heating system of the present invention may be supplemented with power from a utility as shown at reference character 24. In addition, since the electrical heaters are designed to operate on alternating current, the heating system may include a direct current to alternating current inverter 26. However, it should be understood that the heaters may also run on direct current power.

The heating system includes optionally one or more thermostats 36 for controlling the heaters. In a simple system, a single thermostat can be provided, although it is preferred that each heater have an associated thermostat. The control mechanism may also include its own supply of power 30 or can be powered from the power generator and storage shown in FIG. 4.

Referring in particular to FIG. 3, the detailed circuit diagram of the control mechanism is provided. The control mechanism includes a timer 32, a counting mechanism 34, a plurality of thermostats 36 and relay switches 18. It should be understood that the detailed circuit diagram shows a preferred embodiment of the invention however, it should be understood that various switching or coupling methods may be used in replace of those shown in FIG. 3. For example, the relays 18 could be replaced by various types of switches including electrical, mechanical, magnetic, triac switches or various other conventional switches. Also, the counting mechanism may be replaced with a microprocessor programed to effect the desired sequencing or other digital or analog mechanism that generate the desired signals.

The counting mechanism 34 includes an output 40 for each of the switches 18. The counting mechanism is reprogrammed to generate a signal from only one of its outputs 40 at any given time. It should be understood that various types of counting devices may be used and that the number of outputs 40 of the counting device 34 will depend upon the number of heaters to be controlled. In the present invention, it has been found that a decade counter sold by manufacturers under the number designation RS 4017 is suitable for use in the present invention. The counter 34 is actuated by a timer 32 which signals the counting mechanism 34 when to switch the signal from one output to the next. Various types of conventional timers may be used. However, it has been determined that a timer sold under the designation 555 is particularly suitable for use in the present invention. This timer can be set so that the time period for any given signal is approximately between four and five minutes. In the preferred form of the invention, the duration of the signal from the timer is four minutes, twenty seconds. As shown in FIG. 3, the counter as well as the timer are driven by a 12 volt direct current power source 30. Referring to relays 18 in FIG. 3, the power source 14 is connected to terminals 3 and 4 of each relay 18. Each relay is in a normally open position to break the circuit between the power source and its respective heater. Upon receipt of a signal through terminal 2 of each relay 18, the relay closes and its respective heater receives power. As shown in FIG. 3, the relays 18 operate on 24 volts of direct current power. The decade counter 34 operates on 12 volts of power and puts out a low voltage signal. In order to provide for increase of the signal produced by the counter to 24 volts, the system includes a plurality of drivers 46 which each include a 1000 ohm resistor 47.

As shown in FIG. 3, each of the outputs 40 of counter 34 are connected in series through thermostats 36 to its respective relay. In a preferred form of the invention as shown in FIG. 3, each heater includes a thermostat 36 proximate to that heater for sensing the air temperature in the room in which the heater is placed. For example, thermostat 36a will be placed in the room with heater 10a. If the temperature in the room is above a preset level, the thermostat 36 will remain open, and, thus the relay will not receive a signal even though the signal is generated by the counter 34. Thus, when there is no demand for heat as sensed by the thermostat 36a, the heater 10a will not be provided with power.

The control system in accordance with the present invention as shown in FIG. 3, provides a constant time interval during which each heater is operated. It should be understood, however, that if desired, the heating system of the present invention could be modified to vary the time interval during which any one heater 10 is supplied with power. It should be understood that the control mechanism shown in FIG. 3 provides for a repetitive sequencing for actuation of the heaters. This is shown particularly well in FIG. 2 wherein heater 10a is first actuated and then the remaining heaters are actuated in sequence. After one sequence has been completed, the heater 10a is once again actuated. It is contemplated, however, that the control system could readily be modified to alter the sequencing of the actuation of the heaters. For example, when a relatively large room has a single heater therein, it may be desirable to actuate the heater in the large room twice during a sequence of operation of the group of heaters.

Referring to FIG. 4, the power supply is shown. The power supply 14 includes an input 52 for receiving electrical power from a power source and includes an output 54 for transmitting power through input 14 to the heaters 10 (see FIG. 3). The power supply includes a plurality of batteries 56 each having a fuse 57. The power supply also includes circuitry 58 for connecting in parallel the plurality of batteries 56 and circuitry 60 for connecting the plurality of batteries 56 in series to provide output 54 with power. Switches 62 are responsive to a signal for switching between the parallel circuitry 58 and the series circuitry 60. Each switch, which is preferably a relay, has a pair of terminals 1 and 3 connected to its respective battery. The switches 62 also have a pair of terminals 6 and 8 connecting the battery 56 in parallel to the input 52. The switches 62 also have a pair of terminals 5 and 7 connecting its respective battery 56 in series to output 54. The 24 volt switching signal is inputted at terminals 2 and 4 of each switch 62. The input 66 for the signal is generated from terminal 31 from the relays shown in FIG. 3. Optionally, the power supply includes outputs 53 for powering other devices that consume electrical power. The circuitry includes fuses 51 and 55 for protecting the solar cells.

The power supply can be used in the heating system of the present invention or may be used separately to power a water heater, recharge batteries such as those in an electric car or power any other device that consumes electrical power. Moreover, if desired, more than one power supply may be used in a given system.

As can be appreciated from the foregoing description, the heating system of the present invention enables a group of independently operated heaters to be powered by a low current source of energy. As can be appreciated by reference to FIG. 4, the batteries when hooked in series provide service having 120 volts.

In addition to powering two or more heating means, the system may be connected to other devices which consume energy, such as, for example, an electric water heater. Thus, the water heater would, in sequence with the other heaters, receive power from the system.

It should be understood that although specific embodiments of the invention have been described herein in detail, such description is for purposes of illustration only and modifications may be made thereto by those skilled in the art within the scope of the invention.

What is claimed is:

1. A system for space heating a dwelling, office and the like by direct current power generated by photovoltaic solar cells, the system comprising:
    a plurality of electrically powered heating means for space heating, each said heating means being operable independently of the other heating means, each said heating means including an input, said heating means capable of being powered by direct current;
    a chargeable power supply for storing power from said photovoltaic cells and for supplying power to said heating system, the power supply comprising an input for receiving electrical power from said cells, an output for transmitting power to said heating means, a plurality of batteries for storing electrical energy, circuitry for connecting in parallel said plurality of batteries to said input to provide for charging of said batteries, circuitry for connecting in series said plurality of batteries to said output to provide power to said heating means, and means responsive to a signal for switching between said parallel circuitry and said series circuitry;
    a source of electrical power for operating said plurality of heating means comprising said chargeable power supply, said power source being connectable to said input of each said heating means;
    control means connected between said power source and said input of said plurality of heating means for controlling operation of each said heating means, said control means being powered by direct current supplied by said chargeable power supply;
    said control means including for each said heating means a normally open switch means for connecting and disconnecting its respective heating means to said power source;
    said control means further including means for generating a signal for closing each said switch means for a time interval to power its respective heating means, said generating means signaling in a sequence said plurality of switch means to close only one said switch means at a time to thereby power its respective heating means.

2. A system according to claim 1 wherein said sequence comprises a repeating sequence.

3. A system according to claim 1, said time interval for each said switch means being constant.

4. A system according to claim 1 and further including means for thermostatically controlling operation of said plurality of heating means, said thermostat means being connected between said signal generating means and said switch means to prevent said switching means from receiving said signal when a preset temperature level for said thermostat means is exceeded.

5. A system according to claim 4 and further including a thermostat for each said heating means, said thermostat being located proximate its respective heating means and being operably connected between said signal generating means and its respective switch means, said thermostat preventing transmission of said signal when a preset temperature level is reached.

6. A heating system according to claim 1 wherein said signal generating means comprises a counting means having an output for each said switch means, said signal generating means further including a timer operably connected to said counting means for sequentially advancing the signal transmitted from said outputs of said counter.

7. A heating system according to claim 6 wherein said timer is set for a predetermined length of time for each signal generated by said counting means.

8. A heating system according to claim 7 wherein said timer and said counting means are powered by twelve volts direct current from said chargeable power supply, and further including for each said output of said counting means a driver for generating a twenty-four volt direct current signal from said signal received from said counting means.

9. A heating system according to claim 8 wherein each said switch means comprises a relay connected between said power source, said heating means, said relay being normally open and capable of actuation by said twenty-four volt direct current signal from its respective driver to thereby close said relay and provide power to its respective heating means.

10. A heating system according to claim 1 wherein said power source comprises a plurality of solar cells for generating power from sunlight, said solar cells having a twelve volt direct current output and means operably connected to a plurality of electrical storage means.

11. A heating system according to claim 10 wherein said power supply comprises a plurality of twelve volt direct current batteries, said power storage means including switching means for connecting said batteries in series to provide a said source of power for said heating system.

12. A heating system according to claim 11 wherein said storage system includes a switch for each said battery, said plurality of switches normally connecting said batteries in parallel circuitry to provide for charging of said batteries by an input from said solar cell output, said plurality of switches connecting said batteries in series upon receipt of a signal indicating demand for power.

13. A heating system according to claim 1 wherein each said heating means comprises a single electrical resistance heater.

14. A system according to claim 1 wherein said power source comprises said chargeable power supply supplemented by alternating current utility power.

* * * * *